(12) United States Patent
Jeong

(10) Patent No.: US 8,172,298 B2
(45) Date of Patent: May 8, 2012

(54) REINFORCEMENT FOR REAR SEAT BACKS

(75) Inventor: Dong Woo Jeong, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 370 days.

(21) Appl. No.: 12/272,293

(22) Filed: Nov. 17, 2008

(65) Prior Publication Data

US 2009/0261636 A1  Oct. 22, 2009

(30) Foreign Application Priority Data

Apr. 21, 2008 (KR) .................. 10-2008-0036546

(51) Int. Cl.
*B60N 2/42* (2006.01)
*B60N 2/68* (2006.01)
*B60R 9/00* (2006.01)
*B60R 7/00* (2006.01)

(52) U.S. Cl. ............... 296/37.5; 296/37.1; 296/37.16; 297/216.13; 297/452.18

(58) Field of Classification Search ............... 296/64, 296/63, 65.03, 37.5, 37.1, 37.16; 297/320, 297/284.4, 452.2, 216.13, 452.18, 312, 311, 297/344.15, 239, 353; 280/748
See application file for complete search history.

(56) References Cited

U.S. PATENT DOCUMENTS

| 2,622,189 | A | * | 12/1952 | Rahn | 362/484 |
|---|---|---|---|---|---|
| 2,939,740 | A | * | 6/1960 | Bobek et al. | 296/66 |
| 3,873,127 | A | * | 3/1975 | McNichol et al. | 280/202 |
| 5,447,360 | A | * | 9/1995 | Hewko et al. | 297/452.18 |
| 5,575,533 | A | * | 11/1996 | Glance | 297/452.2 |
| 5,931,527 | A | * | 8/1999 | D'Onofrio et al. | 297/146 |
| 5,967,054 | A | * | 10/1999 | Rosenfeld | 108/44 |
| 6,296,291 | B1 | * | 10/2001 | Lansinger | 296/65.16 |
| 6,347,836 | B1 | | 2/2002 | Hayotte | |
| 6,371,561 | B1 | * | 4/2002 | Iwamoto et al. | 297/452.18 |
| 6,386,638 | B1 | * | 5/2002 | Strauch | 297/452.18 |
| 6,742,847 | B2 | * | 6/2004 | Yanai | 297/452.2 |
| 6,981,748 | B2 | * | 1/2006 | Garnweidner et al. | 297/452.18 |
| 7,128,273 | B2 | * | 10/2006 | Kelley et al. | 235/492 |
| 7,311,358 | B2 | * | 12/2007 | White et al. | 297/284.9 |
| 2003/0222475 | A1 | * | 12/2003 | Nakamitsu et al. | 296/37.16 |
| 2007/0114808 | A1 | * | 5/2007 | Yang | 296/37.5 |
| 2007/0205643 | A1 | * | 9/2007 | Fujita et al. | 297/216.12 |
| 2007/0215399 | A1 | * | 9/2007 | Watanabe et al. | 180/68.5 |

FOREIGN PATENT DOCUMENTS

KR  10-1998-56500 A  9/1998

* cited by examiner

*Primary Examiner* — Glenn Dayoan
*Assistant Examiner* — Sunsurraye Westbrook
(74) *Attorney, Agent, or Firm* — Morgan, Lewis & Bockius LLP

(57) ABSTRACT

A reinforcement for rear seat backs is disclosed herein. The rear seat back reinforcement of the present invention includes a luggage bar, which is provided between a rear package tray and a floor panel and has a holding member and a mounting member, and a wire frame, which is held by the holding member of the luggage bar and is fastened at the lower end thereof to the floor panel by the mounting member.

14 Claims, 4 Drawing Sheets

REINFORCEMENT FOR REAR SEAT BACKS

CROSS-REFERENCE TO RELATED APPLICATION

The present application claims priority to Korean Application No. 10-2008-0036546, filed on Apr. 21, 2008, the entire contents of which is incorporated herein for all purposes by this reference.

BACKGROUND OF THE INVENTION

1. Field of the Invention

The present invention relates to a reinforcement for rear seat backs which is provided between a rear package tray and a floor panel of a vehicle to protect a rear seat back from an impact transmitted from luggage in the trunk of the vehicle.

2. Description of Related Art

Various kinds of luggage are stored in trunks of vehicles. When the vehicles suddenly stop, the luggage in the trunks is moved forward by the force of inertia and may strike the backs of rear seats, thus causing the possibility of injury to passengers, who are seated in the rear seats, attributable to impacts transmitted from the luggage to the rear seat backs.

Therefore, reinforcements are typically provided in the rear seat backs. Such reinforcements are also often required by various legislation. Generally, rear seats for vehicles are configured such that seat backs are installed between rear package trays and floor panels. Luggage bars having various shapes are provided in the rear seat backs to reinforce the rear seat backs.

A reinforcement for rear seat backs according to the conventional technique will be explained herein below. However, this does not imply that the structure of the conventional technique was known prior to the filing date.

As a representative example of the conventional rear seat back reinforcements, in the case of low-priced vehicles, a rear seat back reinforcing structure is realized by a method in which a cushion pad of a seat back is attached to a wire frame, a luggage bar is installed between a rear package tray and a floor panel, and the wire frame is fastened to the luggage bar.

Hereinafter, the conventional rear seat back reinforcement will be explained in detail with reference to FIG. 1. In the case of lower-priced vehicles, one of the goals is to maximize the reinforcing effect using a minimum number of elements and through a minimum number of processes of work, to thus reduce the production costs. To achieve the above purpose, a structure in which only two luggage bars 90 are used and a lattice type wire frame 70 supports a seat back is proposed. In detail, the two luggage bars 90 are arranged to form a "V" shape. The upper ends of the luggage bars 90 are bolted to a rear package tray 10, and the lower ends thereof are bolted to a floor panel 30. The wire frame 70 is attached to the seat back to support the seat back. The upper end of the wire frame 70 is mounted to wire brackets 12, which are provided on the rear package tray 10. Fastening members 72, each of which is bent downwards, are provided on the lower end of the wire frame 70, so that the wire frame 70 can be bolted to the floor panel 30 via the fastening members 72.

However, in the conventional rear seat back reinforcement having the above-mentioned construction, to fasten the wire frame to the rear package tray, three wire brackets 12 are respectively provided at left, right and center positions on the upper end of the rear package tray. To fasten the wire frame to the floor panel, the fastening members 72 are provided at left, right and center positions on the lower end of the wire frame. These members for fastening the wire frame require bolting processes, so that there is a disadvantage in that the number of elements and the number of work processes are markedly increased. As such, the conventional rear seat back reinforcement requires a lot of effort and expense for installation and assembly thereof, despite having a basic structure, and is thus not adapted to the purpose of the low-priced vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Accordingly, various aspects of the present invention has been made keeping in mind the above problems occurring in the prior art, and an object of the present invention is to provide a reinforcement for rear seat backs which can reduce the number of elements required to install a wire frame and reduce the number of processes of the installation work, thus reducing production costs despite maintaining the strength of a seat back.

In one aspect, a reinforcement of the present invention for protecting a rear seat back for vehicles from an impact, may include: a luggage bar provided between a rear package tray and a floor panel, the luggage bar having a holding member and a mounting member; and a wire frame mounted on the luggage bar, an upper end of which is held by the holding member of the luggage bar and a portion of a lower end of which is held by the mounting member of the luggage bar, wherein the portion of the lower end of the wire frame and the mounting member are fastened to the floor panel together.

The luggage bar may be oriented in a diagonal direction relative to the wire frame without crossing each other.

The holding member of the luggage bar may be formed by bending an upper end of the luggage bar, the upper end of the wire frame being positioned between a gap formed between the holding member and the rear package tray.

A guide pin may be configured to be inserted into a through-hole formed on the floor panel, the guide pin positioned near to the mounting member of one of the luggage bar to support the one of the luggage bar temporally.

A wire bracket may be provided on the rear package tray to mount the upper end of the wire frame to the rear package tray. The wire frame may have a fastening member formed by extending a wire of the wire frame downwards, so that the wire frame is fastened to the floor panel through the fastening member together with the mounting member of the luggage bar. The fastening member of the wire frame may include a fastening member, wherein one of the fastening member is positioned at a lower medial portion of the wire frame.

In another aspect, a reinforcement system of the present invention for protecting a rear seat back for vehicles from an impact, may include: a luggage bar provided between a rear package tray and a floor panel, the luggage bar having a holding member and a mounting member; and a wire frame mounted on the luggage bar, an upper end of which is held by the holding member of the luggage bar and a portion of a lower end of which is held by the mounting member of the luggage bar, wherein the portion of the lower end of the wire frame and the mounting member are fastened to the floor panel together In further another aspect, a method for assembling reinforcement for protecting a rear seat back for vehicles from an impact, the reinforcement containing a luggage bar provided between a rear package tray and a floor panel, the luggage bar having a holding member and a mounting member; and a wire frame mounted on the luggage bar, an upper end of which is held by the holding member of the luggage bar and a portion of a lower end of which is held by the mounting member of the luggage bar, wherein the portion of the lower end of the wire frame and the mounting member are fastened to the floor panel together, may include steps of: fastening a holding member of one of the luggage bar to the rear package tray; fastening a guide pin near a mounting member of the one of the luggage bar on the floor panel so as to support the mounting member of the one of the luggage bar temporarily on the floor panel; fastening a holding member of the other of the luggage bar to the rear package tray; fastening a mounting member of the other of the luggage bar to the floor panel; assembling the upper end of the wire frame to the holding members of the one and the other of the luggage bar and to a wire bracket formed on the rear package tray; and assembling the lower end of the wire frame with the mounting member of the one of the luggage bar to the floor panel.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
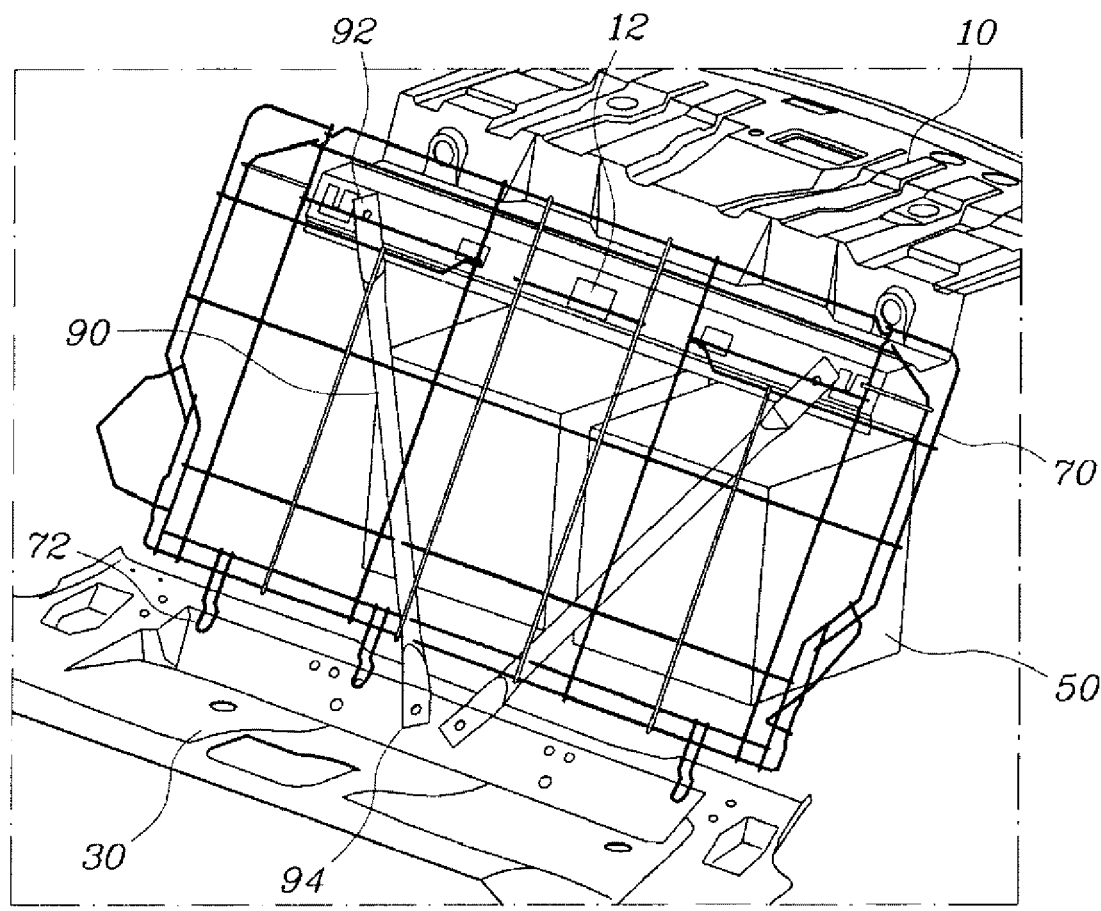
FIG. 1 is a perspective view showing a conventional reinforcement for rear seat backs.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a reinforcement for rear seat backs according to a preferred embodiment of the present invention will be described in detail with reference to the attached drawings.

The reinforcement for rear seat backs according to the present invention includes a luggage bar B, which is installed between a rear package tray 100 and a floor panel 200 and has a holding member 522, and a wire frame 700, which is mounted to the holding member 522 of the luggage bar B and is fastened at the lower end thereof to the floor panel 200. The luggage bar B comprises at least one luggage bar. Preferably, the luggage bar B has a hollow rod shape, the opposite ends of which are flattened by pressing for installation of the luggage bar B. In the case where several luggage bars B are provided, it is preferable that the luggage bars B be arranged in diagonal directions of the wire frame 700 such that the luggage bars B are prevented from crossing each other. Most preferably, two luggage bars B are arranged to form a "V" shape. The holding member 522 of the luggage bar B for installation of the wire frame 700 may be formed using a separate member or, alternatively, it may be formed by bending part of the luggage bar B. Here, the shape of the holding member 522 of the luggage bar B is not limited to any special shape, as long as it can hold a corresponding wire of the wire frame 700. A preferred example pertaining to this will be described later herein with reference to FIG. 3.

The wire frame 700 can be formed in various shapes. Preferably, the wire frame 700 is manufactured using wires in a lattice arrangement. The wire frame 700 has a fastening member 720, which extends downwards from a wire, which forms the lower end of the wire frame 700. The fastening member 720 is used to fasten the wire frame 700 to the floor panel 200. Preferably, the fastening member 720 comprises left and right fastening members 724 and a center fastening member 722, which are provided on the lower end of the wire frame 700.

Meanwhile, a wire bracket 120 for installation of the wire frame 700 is preferably provided on the rear package tray 100. Furthermore, a seat back may be attached to the wire frame 700, after the wire frame 700 is mounted to the luggage bar B. Alternatively, the wire frame 700 may be mounted to the luggage bar B, after the seat back is installed.

Figure 2:
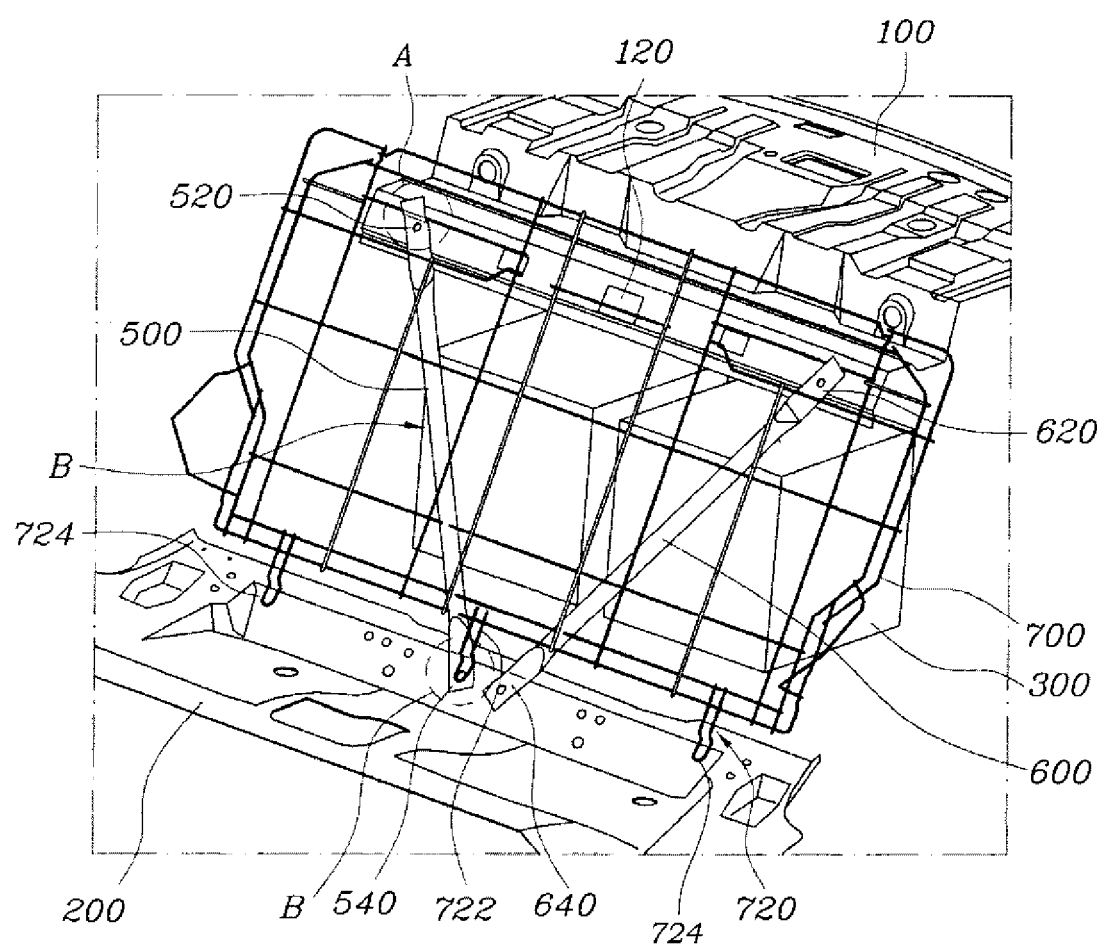
FIG. 2 is a perspective view of an exemplary reinforcement for rear seat backs, according to various aspects of the present invention.

The reinforcement for rear seat backs according to a preferred embodiment of the present invention will be described herein below with reference to FIG. 2. In the present invention, one luggage bar B may be used or, alternatively, a plurality of luggage bars B may be used, but, in the following description of the embodiment, the case where the reinforcement of the present invention is provided with a plurality of luggage bars B will be explained. In the same manner, the wire frame 700 may have one fastening member 720 or a plurality of fastening members 720, but, in the following description, an explanation will be given of the case where the wire frame 700 has a plurality of fastening members 720. In the rear seat back reinforcement according to the preferred embodiment, the luggage bars B comprise a first luggage bar 500, which is disposed at a left position, and a second luggage bar 600, which is disposed at a right position. The wire frame 700 is mounted to the first and second luggage bars 500 and 600, thus protecting the seat back from luggage in the trunk of the vehicle. The first and second luggage bars 500 and 600, which are arranged to form a "V" shape, are fastened at the upper ends thereof to the rear package tray 100 and are fastened at the lower ends thereof to the floor panel 200. Bolting, riveting or welding may be the means indicated by the term "fastening", and, it is preferable that the bolting be used to form a structure such that the elements can be easily removably coupled to each other.

The first luggage bar 500 is fastened at the upper end thereof to the left portion of the rear package tray 100, and is fastened at the lower end thereof to a medial portion of the floor panel 200. A bent holding member 522 is formed on the upper end of the first luggage bar 500. The second luggage bar 600 is fastened at the upper end thereof to a right portion of the rear package tray 100 and is fastened at the lower end thereof substantially to the medial portion of the floor panel 200. In the same manner, a bent holding member is formed on the upper end of the second luggage bar 600. The wire frame 700 has a lattice shape to support the seat back and is fastened to the rear surface of the seat back. The upper end of the wire frame 700 is held by the holding members of the first and second luggage bars 500 and 600. In addition, the lower end of the wire frame 700, along with a mounting member of the lower end of the first or second luggage bar 500 or 600, is fastened to the floor panel 200.

With regard to the fastening of the lower ends of the luggage bars to the floor panel 200, preferably, the lower end of the first luggage bar 500 is fastened to the floor panel 200 at a position spaced apart leftwards from the medial position of the floor panel 200 by a predetermined distance, and the lower end of the second luggage bar 600 is fastened to the floor panel 200 at a position spaced apart rightwards from the medial position of the floor panel 200 by a predetermined distance. Due to this arrangement of the luggage bars, the luggage bars form a "V" shape overall, and can stably protect the seat bar.

Figure 4:
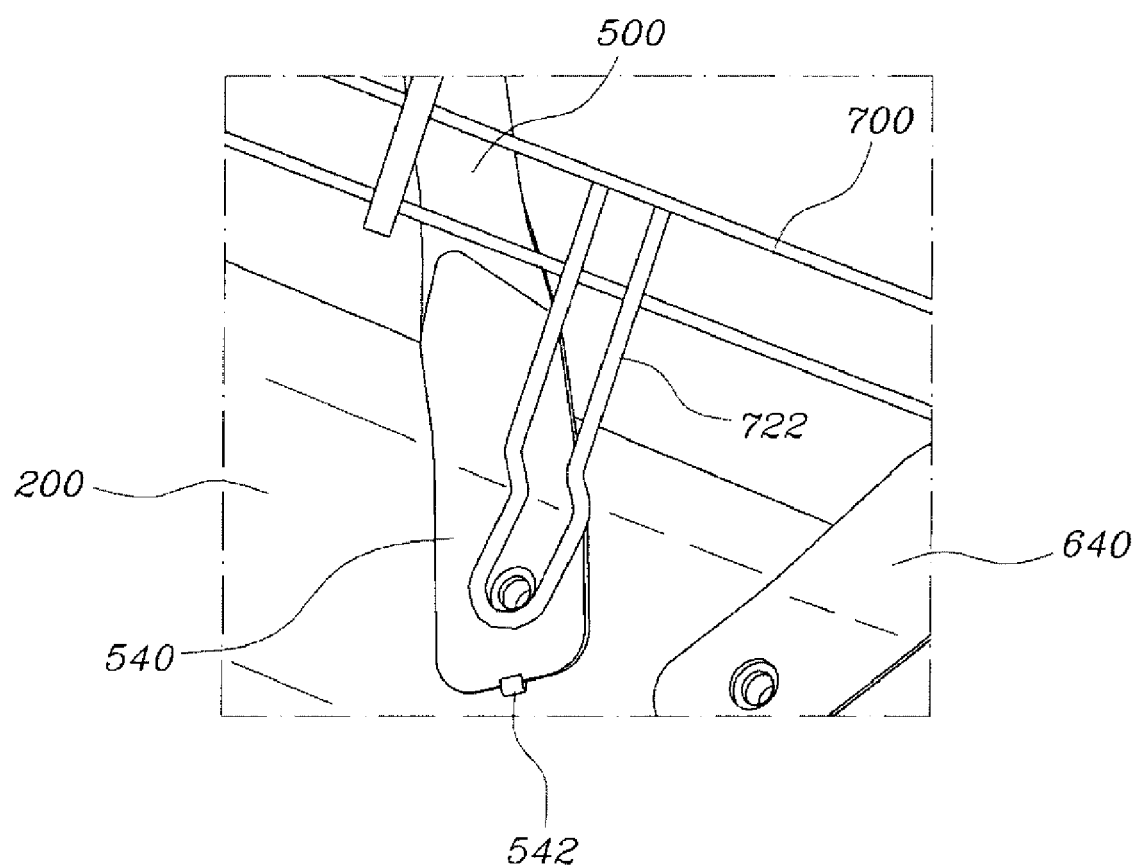
FIG. 4 is a perspective view of a circled portion B of FIG. 2.

The pre-coupling structure of the luggage bars will be explained herein below with reference to FIG. 4. A guide pin 542, which is inserted into a though hole formed in the floor panel 200, is provided on at least one of the lower mounting members 540 and 640 of the first and second luggage bars 500 and 600. Thus, before the luggage bar 500 or 600 or both are fastened to the floor panel 200, the installation position thereof is determined by inserting the guide pin 542 into the through hole in the floor panel 200. As such, the first luggage bar 500 or the second luggage bar 600 or both are pre-fastened to the floor panel 200 using the guide pin 542, and, thereafter, they are fastened to the floor panel 200 along with the lower end of the wire frame 700. Furthermore, a center fastening member 722, which is protruded downwards by extending and bending part of the corresponding wire of the wire frame 700, is provided on the medial portion of the lower end of the wire frame 700. Preferably, the center fastening member 722, along with the lower mounting member 540 or 640 of the first or second luggage bar 500 or 600 having the guide pin 542, is fastened to the floor panel 200. In a preferred example, shown in FIG. 4, the lower mounting member 540 of the first luggage bar 500 is pre-fastened to the floor panel 200 using the guide pin 542, which is provided on the lower mounting member 540 so that the lower portion of the first luggage bar 500 is temporarily fastened on the floor panel 200. Subsequently, the lower mounting member 540 of the first luggage bar 500, along with the center fastening member 722 of the wire frame 700, is bolted to the floor panel 200.

Figure 3:
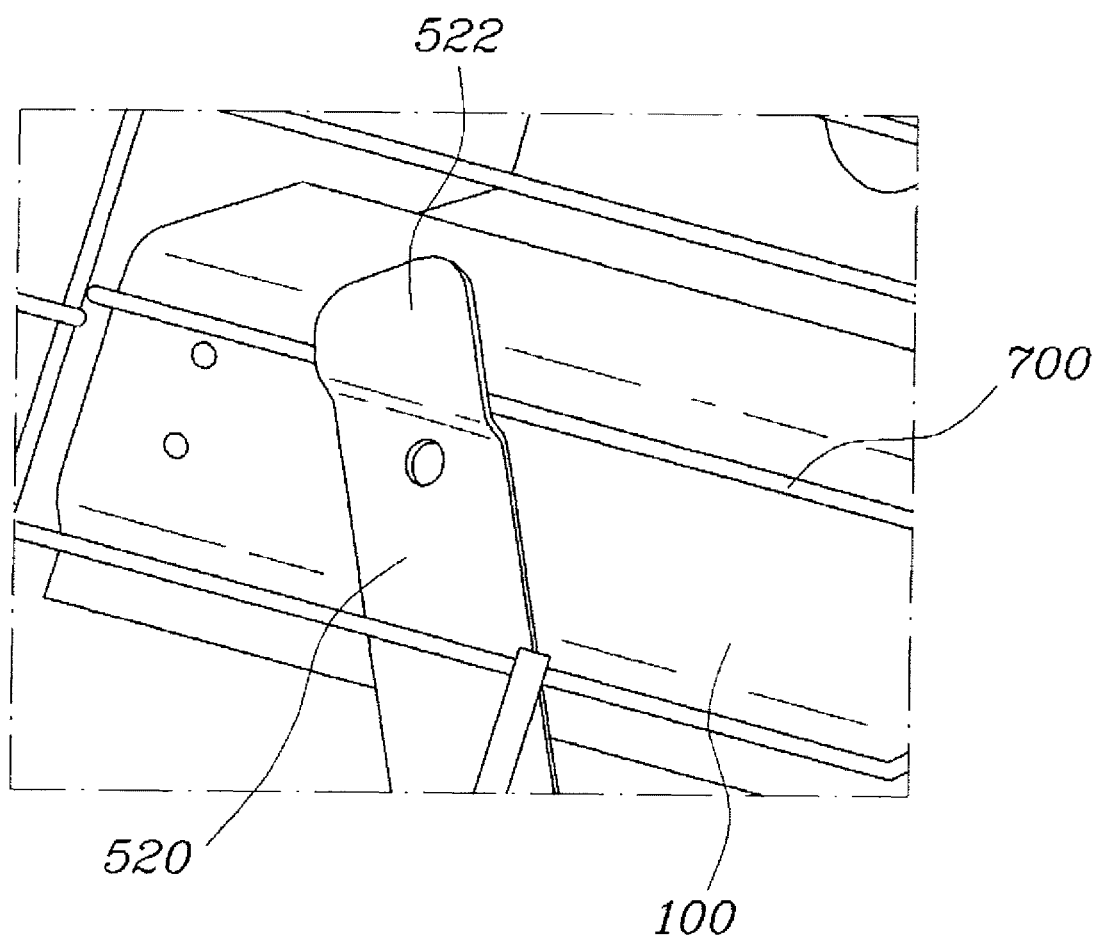
FIG. 3 is a perspective view of a circled portion A of FIG. 2.

Hereinafter, the installation of the wire frame will be explained with reference to FIGS. 2 and 3. As shown in FIG. 3, the bent holding member 522 is provided on an upper mounting members 520 and 620 of each luggage bar 500, 600. The left and right members of the wire frame 700 are respectively held by the holding members 522 of the luggage bars 500 and 600. The upper central portion of the wire frame 700 is held by the wire bracket 120, which is provided on the rear package tray 100. The holding member 522, which serves to hold the wire frame 700, can have various shapes. Preferably, the holding member 522 is formed by bending the upper end of the luggage bar B such that it is spaced apart from the rear package tray 100 by a predetermined distance. The corresponding wire of the wire frame 700 is inserted into and held by the gap between the holding member 522 and the rear package tray 100. The left and right fastening members 724, each of which is protruded downwards by extending and bending parts of the corresponding wires of the wire frame 700, are respectively provided on the left and right members of the lower end of the wire frame 700. The left and right fastening members 724 are fastened to the floor panel 200.

The assembly of the rear seat back reinforcement according to the preferred embodiment of the present invention is as follows. The upper mounting member 520 of the first luggage bar 500 is bolted to the rear package tray 100, and the guide pin 542 of the lower mounting member 540, which is provided on the lower end of the first luggage bar 500, is inserted into the through hole in the floor panel 200. Thereafter the lower mounting member 540 of the first luggage bar 500 is pre-fastened to the floor panel 200 using the guide pin 542. An upper mounting member 620 of the second luggage bar 600 is bolted to the rear package tray 100, and the lower mounting member 640 of the second luggage bar 600 is bolted to the floor panel 200. Subsequently, the upper end of the wire frame 700 is held both by the holding members 522 of the first and second luggage bars 500 and 600 and by the wire bracket 120. The lower center fastening member 722 of the wire frame 700, along with the first luggage bar 500, is bolted to the floor panel 200, and, thereafter, the left and right fastening members 724 of the wire frame 700 are bolted to the floor panel 200.

As described above, a reinforcement for rear seat backs according to the present invention having the above-mentioned construction can effectively protect a rear seat back despite the use of a relatively small number of elements. Furthermore, in the present invention, the shape of a luggage bar is improved so as to provide a substitute for brackets, so that the number of brackets provided on a rear package tray can be reduced, thus reducing the costs of producing the rear seat back reinforcement despite ensuring the superior strength thereof.

In addition, a lower center fastening part of a wire frame is aligned with a lower mounting member of the luggage bar, and the lower center fastening member and the lower mounting member are fastened to a floor panel together, thus reducing the number of processes involved in the fastening operation.

For convenience in explanation and accurate definition in the appended claims, the terms "up" or "upper", "down" or "lower", "front" or "rear", "inside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A reinforcement for protecting a rear seat back for vehicles from an impact, comprising:

a luggage bar secured to a rear package tray and a floor panel, the luggage bar having a holding member and a mounting member; and a wire frame separately mounted on the luggage bar, an upper end of which is held by the holding member of the luggage bar and a portion of a lower end of which is held by the mounting member of the luggage bar, wherein the portion of the lower end of the wire frame and the mounting member are fastened to the floor panel together.

2. The reinforcement as set forth in claim 1, wherein the luggage bar is oriented in a diagonal direction relative to the wire frame without crossing each other.

3. The reinforcement as set forth in claim 1, wherein the holding member of the luggage bar is formed by bending an upper end of the luggage bar, the upper end of the wire frame being positioned between a gap formed between the holding member and the rear package tray.

4. The reinforcement as set forth in claim 1, wherein a guide pin is configured to be inserted into a through-hole formed on the floor panel, the guide pin positioned near to the mounting member of one of the luggage bar to support the one of the luggage bar temporarily.

5. The reinforcement as set forth in claim 1, wherein a wire bracket is provided on the rear package tray to mount the upper end of the wire frame to the rear package tray.

6. The reinforcement as set forth in claim 1, wherein the wire frame has a fastening member formed by extending a wire of the wire frame downwards, so that the wire frame is fastened to the floor panel through the fastening member together with the mounting member of the luggage bar.

7. The reinforcement as set forth in claim 6, wherein the fastening member of the wire frame comprises a fastening member, wherein one of the fastening member is positioned at a lower medial portion of the wire frame.

8. A reinforcement system for protecting a rear seat back for vehicles from an impact, comprising:

a luggage bar secured to a rear package tray and a floor panel, the luggage bar having a holding member and a mounting member; and a wire frame mounted on the luggage bar, an upper end of which is held by the holding member of the luggage bar and a portion of a lower end of which is held by the mounting member of the luggage bar, wherein the portion of the lower end of the wire frame and the mounting member are fastened to the floor panel together.

9. A passenger vehicle comprising the reinforcement as set forth in claim 1.

10. A passenger vehicle comprising the reinforcement system as set forth in claim 8.

11. A method for assembling reinforcement for protecting a rear seat back for vehicles from an impact, the reinforcement containing a luggage bar secured to a rear package tray and a floor panel, the luggage bar having a holding member and a mounting member; and a wire frame separately mounted on the luggage bar, an upper end of which is held by the holding member of the luggage bar and a portion of a lower end of which is held by the mounting member of the luggage bar, wherein the portion of the lower end of the wire frame and the mounting member are fastened to the floor panel together, comprising steps of:

fastening a holding member of one of the luggage bar to the rear package tray;

fastening a guide pin near a mounting member of the one of the luggage bar on the floor panel so as to support the mounting member of the one of the luggage bar temporarily on the floor panel;

fastening a holding member of the other of the luggage bar to the rear package tray;

fastening a mounting member of the other of the luggage bar to the floor panel;

assembling the upper end of the wire frame to the holding members of the one and the other of the luggage bar and to a wire bracket formed on the rear package tray; and assembling the lower end of the wire frame with the mounting member of the one of the luggage bar to the floor panel.

12. The reinforcement system of claim 8, wherein the wire frame has a lattice shape to support the seat back.

13. The reinforcement system of claim 12, wherein the sire frame is fastened to the rear surface of the seat back.

14. The reinforcement system of claim 8, further comprising a pair of luggage bars secured to the rear package tray and the flour panel, wherein the luggage bars are arranged in a V-shape.

* * * * *